United States Patent Office 3,471,250
Patented Oct. 7, 1969

3,471,250
PREPARATION OF ANHYDROUS INORGANIC METAL HALIDES AND ORGANIC COMPLEXES THEREOF
Horst G. Langer, Cochituate, Mass., assignor to The Dow Chemical Company, Midland, Mich., a corporation of Delaware
No Drawing. Continuation-in-part of application Ser. No. 339,855, Jan. 24, 1964. This application Apr. 18, 1967, Ser. No. 631,590
Int. Cl. B01j 5/34, 5/30; C07c 147/00
U.S. Cl. 23—91                              8 Claims

ABSTRACT OF THE DISCLOSURE

A method for preparing a complex of an inorganic metal halide comprising contacting at room or elevated temperatures an organic complexing agent with a solid inorganic hydrated metal halide which undergoes hydrolysis at room or elevated temperature with formation of hydrogen halide, the complexing agent being characterized as having electron pairs available for coordination to the cation of said hydrated halide, thereby to form an anhydrous or hydrated halide complex, which can, if desired, be further treated by heating and/or subjecting to a reduced pressure to expel the complexed organic groupings and any water of hydration to provide an anhydrous metal halide.

---

The present application is a continuation-in-part of prior application Ser. No. 339,855 filed Jan. 24, 1964, now abandoned.

The term "halides" as used herein means chlorides, bromides, iodides and excludes fluorides.

The terms "complex halide" and "complex compound," as used herein, refer to the metal halide complexes.

Molten, substantially anhydrous magnesium chloride has long been used as an electrolyte in the electrolytic manufacture of magnesium metal. Those methods known heretofore to produce anhydrous magnesium chloride include thermal decomposition of ammonium carnallite and thermal decomposition of magnesium chloride hexahydrate in a stream of hydrogen chloride gas. Both of these methods involve the circulation of large amount of chemicals in anhydrous systems, ammonium chloride in the former method and hydrogen chloride in the latter method, with the necessity of drying both of said chemicals before recycling for further use. Thus, an efficient method of producing anhydrous magnesium chloride and other anhydrous metal halides is an existing need.

It is an object of the instant invention to provide a method for making anhydrous metal halides, including magnesium chloride, from the corresponding metal halide hydrate wherein there are no requirements for large amounts of costly chemicals nor operation under anhydrous conditions.

In addition, it is an object of the present invention to provide a method for preparing a complex compound from a metal halide hydrate which can be used as a starting material in the production of the corresponding anhydrous metal halide by thermal decomposition of said complex compound.

Other uses, objects and advantages of the instant invention will become apparent from the following detailed description disclosed hereinafter.

In general, the instant invention involves contacting a sufficient amount of a hydrolyzable, hydrated, solid, inorganic metal halide with an organic complexing agent having electron pairs available for coordination to the cation of the halide at a temperature substantially at or below the boiling point of said complexing agent to provide a concentrated mixture, the amount of complexing agent employed being sufficient to provide a molar ratio of at least 1 with said halide, and preferably to provide a slight stoichiometric excess of said agent.

The mixture so-formed usually is caused to be saturated, or substantially saturated, or to approach saturation with respect to the complex formers, such as the inorganic halide reactant and complexing agent reactant to precipitate a crystalline complex of said inorganic halide and organic complexing agent. This complex may either be anhydrous as formed containing one or more moles of the complexing agent, or, hydrated to the extent of containing one or more moles of water of hydration and one or more moles of the organic complexing agent.

Saturation may be brought about by one of many means. For example, the inorganic halide and complexing agent may be contacted at an elevated temperature to provide a concentrated liquid mixture, which may then be cooled to a lower temperature to precipitate crystals of the complex. These crystals can be separated, washed and used as such, or may be heated at atmospheric or less than atmospheric pressure to remove all the organic groupings and any hydrated water in the complex to produce an anhydrous metal inorganic halide substantially free of impurities.

Saturation may also be caused by dissolving in a liquid mixture the inorganic halide hydrate in a sufficient amount of polar liquid such as, for example, ethanol, chloroform, or acetone, depending on the metal halide employed, at ambient room temperatures, whereupon, a sufficient amount of complexing agent (polar) is added to provide at least a 1 to 1 molar ratio with the halide and preferably a slight excess of said complexing agent to cause precipitation of a complex halide which may either be anhydrous or hydrated, depending on the particular metal halide being complexed. In some cases it may be necessary to add an organic non-polar precipitating agent such as, e.g., carbon tetrachloride, benzene, methylene chloride, light fractions of hydrocarbon liquids, and the like to promote precipitation of the halide complex from the liquid mixture. So-formed the crystalline complex may then be heated, preferably under a low absolute pressure, to provide if desired, the corresponding anhydrous inorganic metal halide in accordance with the present invention. The examples appearing hereinafter are illustrative of the foregoing embodiments of the process of the present invention. Other means may also be employed to cause precipitation of the halide complex crystals.

The halide complex may be placed in a vessel which may be evacuated (e.g., from about $10^{-2}$ to about $10^{-9}$ torr, and preferably about $10^{-4}$ torr and less than $10^{-9}$ torr) while said complex is undergoing thermal degradation to insure substantially complete conversion to the anhydrous halide.

In a preferred embodiment of the instant invention, magnesium chloride hexahydrate is dissolved in dimethylsulfoxide, as complexing agent, at a temperature within the range of from about 60° to about 100° C. to provide a concentrated solution of the magnesium chloride hexahydrate and, preferably, which is substantially saturated or approaches saturation with respect to magnesium chloride hexahydrate. The mixture is then cooled to a temperature preferably within the range of from about 10° to about 20° C. to precipitate crystals of magnesium chloride dihydrate·dimethylsulfoxide corresponding to the empirical formula, $MgCl_2 \cdot 2H_2O \cdot 4CH_3SOCH_3$. The crystals can be heated to a temperature within the range of from about 250° to about 350° C., and preferably about 300° C., to drive off the water of hydration and all or some organic groupings. A product of substantially anhydrous magnesium chloride is thereby produced.

The complex halide compound, $$MgCl_2 \cdot 2H_2O \cdot 4CH_3SOCH_3$$

formed by the method of the instant invention, is a colorless solid, slightly hygroscopic and melts at approximately 100° C. at ordinary pressures with release of $H_2O$ and some $CH_3SOCH_3$.

Inorganic metal halides which may be used as a raw material in the instant invention include any halide, as defined, which is hydrated and undergoes hydrolysis at room temperature with formation of a hydrogen halide and includes, for example, $MgCl_2 \cdot 6H_2O$, $MgBr_2 \cdot 6H_2O$, $MgI_2 \cdot 8H_2O$, $SnCl_2 \cdot 2H_2O$, $FeCl_3 \cdot 6H_2O$, $FeCl_2 \cdot 4H_2O$, $FeBr_3 \cdot 6H_2O$, $FeI_2 \cdot 4H_2O$, $CrCl_3 \cdot 10H_2O$, $CrBr_3 \cdot 6H_2O$, $AlCl_3 \cdot 6H_2O$, $AlI_3 \cdot 6H_2O$, and $AlBr_3 \cdot 6H_2O$. These halides or mixed halides first can, if desired, be dissolved in water and then reacted with the complexing agent.

Complexing agents suitable for use in the instant invention are compounds containing elements, e.g., oxygen, sulfur, phosphorus and nitrogen, with electron pairs available for coordination to the cation of the halide including, for example, members selected from the group consisting of compounds having the empirical formulas of $RSOR$, $R_3N$, $R_3P=O$, $R_3P$, $R-S-R$ and $R-SO_2-R$, wherein R represents an aliphatic, alicyclic or aromatic organic hydrocarbon radical group containing from 1 to 8 carbon atoms.

Saturated aliphatic sulfoxides wherein each alkyl group contains from 1 to about 4 carbon atoms are particularly suitable for use as complexing agents herein. Illustrative species of such organic sulfoxides include, for example, dimethylsulfoxide, diethylsulfoxide, dipropylsulfoxide, dibutylsulfoxide, ethylenesulfoxide, tetramethylene sulfoxide or aqueous solutions thereof. Dimethylsulfoxide, the preferred complexing agent for use in the instant method, can be used by itself or as an aqueous solution containing up to about 50 percent water. Examples of other complexing agents suitable for use herein include trimethylamine, triethylamine, triethylphosphine oxide, triphenylphosphine oxide, diethylsulfide, diphenylsulfide, diethylsulfone and diphenylsulfone.

The following examples are illustrative of the instant invention and are in no way meant to limit the invention thereto.

Example I

About 20 grams of solid magnesium chloride hexahydrate was dissolved in about 50 milliliters of an aqueous solution of dimethylsulfoxide containing more than 90 percent by weight $CH_3SOCH_3$ at 80° C. A saturated solution of magnesium hexahydrate in the dimethylsulfoxide solution was obtained.

The so-saturated solution was then cooled to approximately 20° C. by running cold tap water over the reaction vessel, whereupon, crystals identified as the complex compound corresponding to the empirical formula $$MgCl_2 \cdot 2H_2O \cdot 4CH_3SOCH_3$$

appeared.

The $MgCl_2 \cdot 2H_2O \cdot 4CH_3SOCH$ crystals were separated from the mother liquor by filtration and placed in a vessel which was evacuated to about $10^{-8}$ torr while heating said crystals at about 300° C. for about 10 minutes. During this period, water and dimethylsulfoxide were released from the crystals. The final product was substantially anhydrous magnesium chloride having a weight composition of greater than 99 percent $MgCl_2$. There was less than one percent impurities in the form of $CH_3SOCH_3$ present. If desired, this substantially anhydrous product can be purified further by evacuating and heating the product in the aforesaid manner for an additional period, e.g., about 10 minutes.

Example II

About 0.01 mole (2.25 grams) of stannous chloride dihydrate, $SnCl_2 \cdot 2H_2O$ was dissolved at ambient room temperature in about 5 mls. of absolute ethyl alcohol, whereupon, about 0.01 mole (0.75 gram) of dimethylsulfoxide was added to conveniently saturate the resulting solution and cause formation of a precipitate comprising anhydrous stannous chloride complexed with dimethylsulfoxide $(SnCl_2 \cdot (CH_3)_2SO)$ in an amount of about 0.8 gram. This crystalline precipitate was separated from its mother liquor by filtration and placed in a vessel which was evacuated to about 3 mm. of Hg pressure while heating the crystals to a temperature of from about 100 to about 110° C. for 10 hours to drive off the dimethylsulfoxide. The final product comprised 0.5 gram of anhydrous $SnCl_2$, with some stannic chloride as an impurity being present.

Example III

About 2.75 grams of ferric chloride hexahydrate $(FeCl_3 \cdot 6H_2O)$ was dissolved in 30 mls. of ethanol, then 1.56 grams of dimethylsulfoxide added to that to provide a bright yellow solution containing an anhydrous precipitate comprising a complex of ferric chloride with two moles of dimethylsulfoxide. Being essentially non-hygroscopic and stable at room temperatures, this complex is useful as an intermediate for a reaction requiring anhydrous $FeCl_3$. The precipitate can be separated from its mother liquor by filtration then heated, e.g., to a temperature not exceeding about 150° C. in a high vacuum to obtain anhydrous $FeCl_3$. This example is illustrative of a process in accordance with the present invention for producing an inorganic metal halide complex suitable for use as a starting material in the production of anhydrous metal halides.

Example IV

About 0.05 mole (11.88 grams) of $NiCl_2 \cdot 6H_2O$ was dissolved in 0.15 mole of dimethylsulfoxide (DMSO). A dark green solution was obtained. Sufficient acetone was added thereto in an amount to saturate the solution at 50° C. and to precipitate a blue crystalline precipitate as a complex of the hydrate and DMSO. The precipitate was recovered by filtration and dried and analyzed to be $NiCl_2 \cdot 3DMSO$. The material so-recovered was heated to a temperature of 200 to 220° C. to obtain a yellowish brown solid of $NiCl_2 \cdot DMSO$ complex. This solid can be heated in a high vacuum to obtain anhydrous $NiCl_2$.

Example V

Example II was essentially repeated except that as the organic complexing agent diphenylsulfoxide was employed. Substantially anhydrous stannous chloride was produced.

In a manner similar to the foregoing, inorganic metal hydrated halides including, but not limited to, magnesium chloride dihydrate, magnesium bromide hexahydrate, magnesium iodide octahydrate, stannous chloride dihydrate, ferric chloride hexahydrate, ferrous chloride tetrahydrate, ferric bromide hexahydrate, ferrous iodide tetrahydrate, chromium chloride decahydrate, chromium bromide hexahydrate, aluminum chloride hexahydrate, aluminum iodide hexahydrate and aluminum bromide hexahydrate can be reacted with complexing agents including, but not limited to, dimethylsulfoxide, diethylsulfoxide, dipropylsulfoxide, dibutylsulfoxide, ethylenesulfoxide, tetramethylenesulfoxide, trimethylamine, triethylamine, triethylphosphine oxide, triphenylphosphine oxide, diethylsulfide, diphenylsulfide, diethylsulfone and diphenyl sulfone to produce a complex halide product which can subsequently be converted to a corresponding anhydrous halide product.

I claim:

1. A method for processing an inorganic hydrated metal halide which comprises:
    (a) contacting in a liquid mixture an organic complexing agent reactant below or at a maximum temperature corresponding to the boiling point of said agent with a solid inorganic hydrated metal halide reactant which undergoes hydrolysis at room or elevated temperature with formation of hydrogen halide, said complexing agent being a member selected from the group consisting of RSOR, $R_3N$, $R_3P=O$, $R_3P$, R—S—R, or R—$SO_2$—R, wherein R represents an organic radical selected from the group of aliphatic, alicyclic, and aromatic hydrocarbon radicals containing from 1 to 8, inclusive, carbon atoms, the complexing agent being further characterized as having electron pairs available for coordination to the cation of said inorganic hydrated halide, the amount of complexing agent employed being sufficient to at least provide a molar ratio of one with the inorganic halide, (b) saturating the so-formed reaction mixture with respect to the reactants to thereby precipitate crystals of a complex of said inorganic hydrated metal halide and said organic complexing agent, and (c) separating said crystals of said complex from the liquid mixture.

2. The method of claim 1 wherein the contacting step (a) comprises dissolving the solid inorganic hydrate metal halide in a liquid mixture of the organic complexing agent at an elevated temperature below or at a maximum corresponding to the boiling point of said agent, and saturating the mixture in step (b) by cooling same until crystals of the corresponding complex appear, then separating said crystals.

3. The method of claim 1 wherein the inorganic hydrated metal halide is magnesium chloride hexahydrate.

4. The method of claim 1 wherein the organic complexing agent is dimethylsulfoxide.

5. The method of claim 1 wherein the step (b) of saturating the liquid mixture comprises first dissolving the inorganic metal halide hydrate at room or elevated temperature in a polar liquid, and then adding the organic complexing agent to precipitate crystals of the complex.

6. The method of claim 5 wherein an organic non-polar precipitating agent is added to the inorganic metal halide hydrate and organic complexing agent liquid mixture in sufficient amount to promote precipitation of the complex.

7. The method of claim 1 and including the step of heating the complex crystals at a pressure not substantially exceeding atmospheric pressure for a time and temperature sufficient to drive off essentially all the organic complexing agent groups and any water of hydration thereby to provide the corresponding inorganic metal halide substantially anhydrous form.

8. The method of claim 7 wherein the heating of said complex is carried out in a vacuum within the range of from about $10^{-2}$ to about $10^{-9}$ torr.

References Cited

UNITED STATES PATENTS 3,397,216   8/1968   Welch et al. _____ 260—429.5

OTHER REFERENCES

Lindquist: "Inorganic Adduct Molecules of Oxo-Compounds" (1963), pp. 38 and 39.

CHARLES B. PARKER, Primary Examiner

D. R. PHILLIPS, Assistant Examiner

U.S. Cl. X.R.

23—87, 93, 98; 260—429.7, 438.5, 439, 448, 583, 606.5, 607, 609